(12) United States Patent
Dartford et al.

(10) Patent No.: US 7,766,580 B2
(45) Date of Patent: Aug. 3, 2010

(54) ENERGY MANAGING KEEL JOINT

(75) Inventors: David William Dartford, Houston, TX (US); Timothy Steven Williams, Fresno, TX (US); George William Tisdale, Spring, TX (US)

(73) Assignee: National Oilwell Varco, L.P., Houston, TX (US)

( * ) Notice: Subject to any disclaimer, the term of this patent is extended or adjusted under 35 U.S.C. 154(b) by 268 days.

(21) Appl. No.: 12/070,064

(22) Filed: Feb. 14, 2008

(65) Prior Publication Data

US 2009/0209352 A1    Aug. 20, 2009

(51) Int. Cl.
 *E21B 19/24*   (2006.01)
(52) U.S. Cl. .................................. 405/216; 405/224.2
(58) Field of Classification Search .............. 405/224.2, 405/224.3, 224.4, 224, 223.1, 216; 166/367, 166/359, 350
See application file for complete search history.

(56) References Cited

U.S. PATENT DOCUMENTS

| | | | |
|---|---|---|---|
| 3,370,432 A | 2/1968 | Butler et al. | |
| 3,705,432 A * | 12/1972 | Watkins, Jr. | 405/224.2 |
| 3,933,203 A | 1/1976 | Evans | 166/241 |
| 4,031,919 A | 6/1977 | Ortloff et al. | 137/799 |
| 4,176,986 A | 12/1979 | Taft et al. | 405/211 |
| 4,422,801 A * | 12/1983 | Hale et al. | 405/224.2 |
| 4,477,207 A * | 10/1984 | Johnson | 166/350 |
| 4,505,618 A | 3/1985 | Yashima | 405/211 |
| 4,634,314 A | 1/1987 | Pierce | 405/195 |
| 4,646,840 A * | 3/1987 | Bartholomew et al. | 166/350 |
| 4,741,647 A | 5/1988 | Dumazy et al. | 405/202 |
| 4,844,213 A | 7/1989 | Travis | 188/377 |
| 4,909,327 A * | 3/1990 | Roche | 166/359 |
| 5,095,981 A | 3/1992 | Mikolajczyk | 166/241.6 |
| 5,169,265 A | 12/1992 | Butler et al. | 405/224.4 |
| 5,238,062 A | 8/1993 | Reinholdt | 166/241.7 |
| 5,330,294 A * | 7/1994 | Guesnon | 405/224.2 |
| 5,377,763 A | 1/1995 | Pearce et al. | 166/367 |
| 5,575,333 A | 11/1996 | Lirette et al. | 166/241.1 |
| 5,628,586 A | 5/1997 | Arlt, III | 405/195.1 |
| 5,683,205 A | 11/1997 | Halkyard | 405/224.2 |
| 5,730,554 A | 3/1998 | Mosley | 405/195.1 |
| 5,873,677 A | 2/1999 | Davies et al. | 405/195.1 |
| 5,887,659 A | 3/1999 | Watkins | 166/350 |
| 5,908,072 A | 6/1999 | Hawkins | 166/241.6 |
| 5,931,602 A | 8/1999 | Gulbrandsen et al. | 405/224 |
| 5,971,075 A | 10/1999 | Odru et al. | 166/350 |
| 6,155,748 A * | 12/2000 | Allen et al. | 405/223.1 |
| 6,176,646 B1 | 1/2001 | Finn et al. | 405/224.2 |

(Continued)

FOREIGN PATENT DOCUMENTS

GB    2.403.993    1/2005

*Primary Examiner*—Frederick L Lagman
(74) *Attorney, Agent, or Firm*—Williams, Morgan & Amerson, P.C.

(57) ABSTRACT

A keel joint protector, which, in certain aspects, includes a body made of flexible material, a central open bore through the body, and the body having a plurality of spaced-apart energy management zones therein for diffusing a force applied to a particular part of the body. This abstract is provided to comply with the rules requiring an abstract which will allow a searcher or other reader to quickly ascertain the subject matter of the technical disclosure and is submitted with the understanding that it will not be used to interpret or limit the scope or meaning of the claims, 37 CFR 1.72(b).

20 Claims, 9 Drawing Sheets

U.S. PATENT DOCUMENTS

| | | | |
|---|---|---|---|
| 6,422,791 B1 | 7/2002 | Pallini, Jr. et al. | 405/224.2 |
| 6,435,275 B1 | 8/2002 | Kirk et al. | 166/241.1 |
| 6,612,370 B1 * | 9/2003 | Jahnsen et al. | 405/224.2 |
| 6,739,395 B2 | 5/2004 | Reynolds | 166/346 |
| 6,746,182 B2 | 6/2004 | Munk et al. | 405/224.2 |
| 6,755,595 B2 | 6/2004 | Oram | 405/216 |
| 6,821,055 B2 * | 11/2004 | Oram | 405/224.2 |
| 6,884,003 B2 | 4/2005 | Horton, III | 405/224.2 |
| 7,013,824 B2 | 3/2006 | Otten et al. | 114/264 |
| 7,067,201 B2 | 6/2006 | Ellis et al. | 428/668 |
| 7,114,885 B2 | 10/2006 | Loset et al. | 405/224.2 |
| 7,121,767 B1 | 10/2006 | Watkins | 405/216 |
| 7,144,048 B2 | 12/2006 | Humphreys | 285/290.3 |
| 7,156,039 B2 | 1/2007 | Charnock et al. | 114/293 |
| 7,159,668 B2 | 1/2007 | Herrera | 166/381 |
| 7,217,067 B2 | 5/2007 | Mao et al. | 405/224.2 |
| 7,393,158 B2 * | 7/2008 | Caldwell et al. | 405/224.2 |
| 2003/0026663 A1 * | 2/2003 | Guesnon et al. | 405/224.2 |
| 2003/0150618 A1 * | 8/2003 | Nish et al. | 166/350 |
| 2004/0013473 A1 * | 1/2004 | Gibson | 405/211 |
| 2004/0076478 A1 * | 4/2004 | Legras et al. | 405/224.2 |
| 2004/0126192 A1 * | 7/2004 | Nish et al. | 405/224.2 |
| 2004/0175240 A1 * | 9/2004 | McMillan et al. | 405/211 |
| 2005/0082056 A1 | 4/2005 | Baxter et al. | 166/241.6 |
| 2005/0084337 A1 * | 4/2005 | Caldwell et al. | 405/224.2 |
| 2006/0177273 A1 | 8/2006 | Bonnemaire et al. | 405/211 |

* cited by examiner

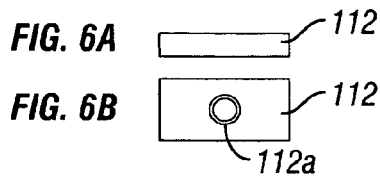
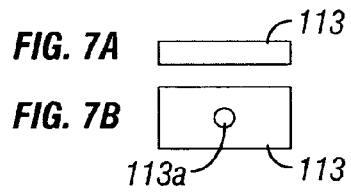
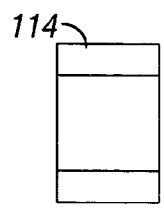
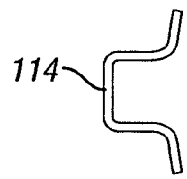
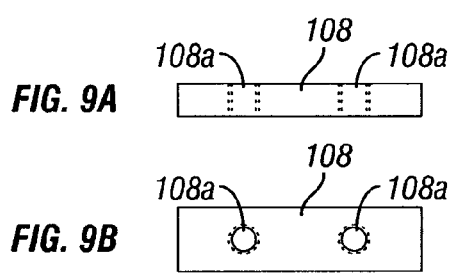
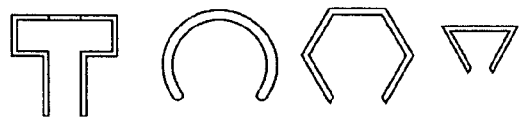
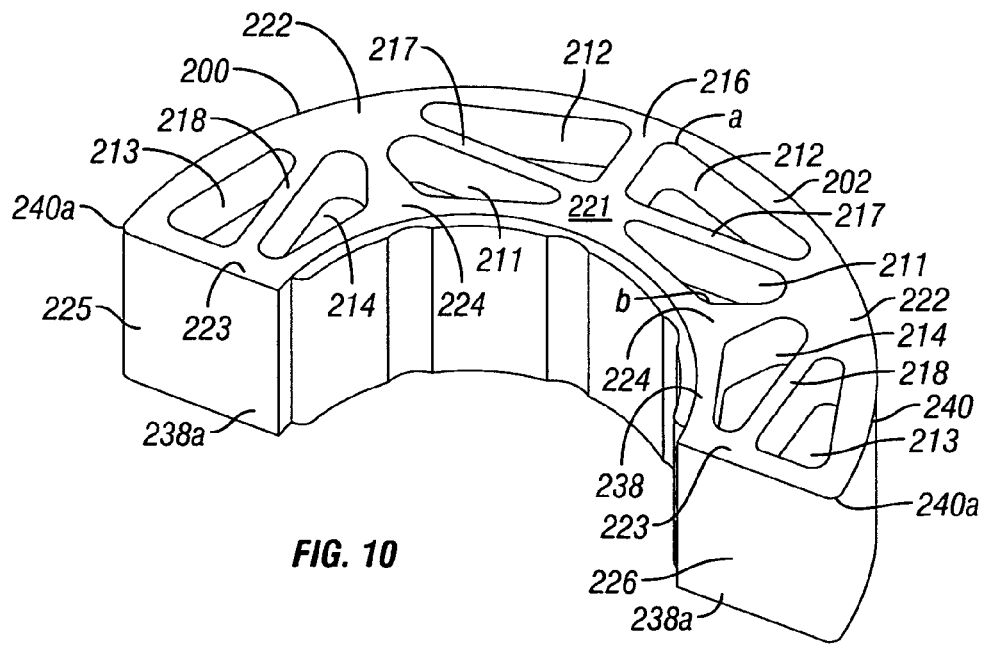

FIG. 10A
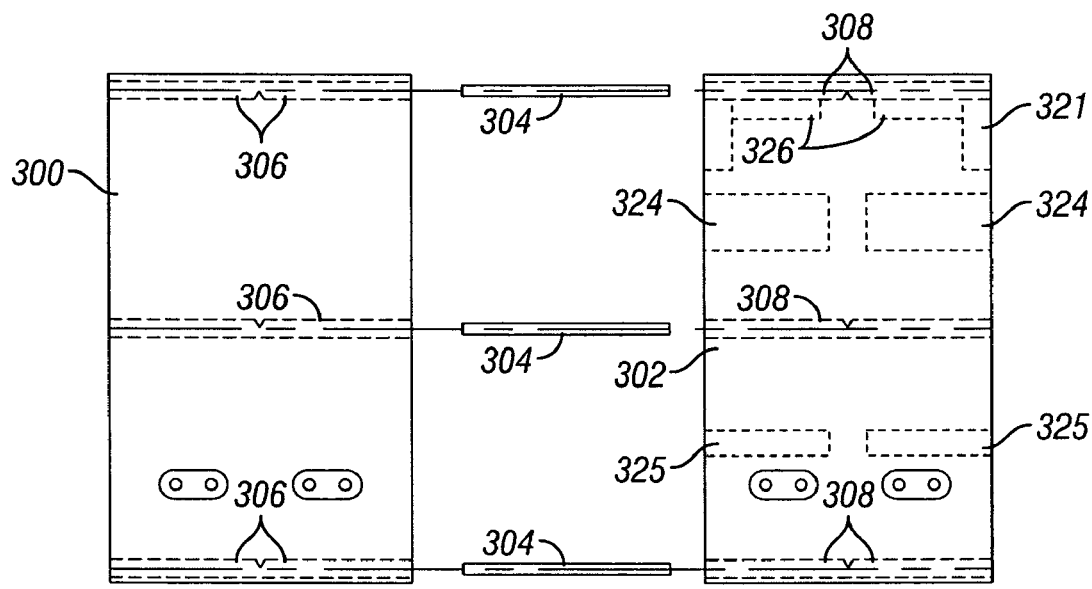
FIG. 11A  FIG. 11B  FIG. 11C
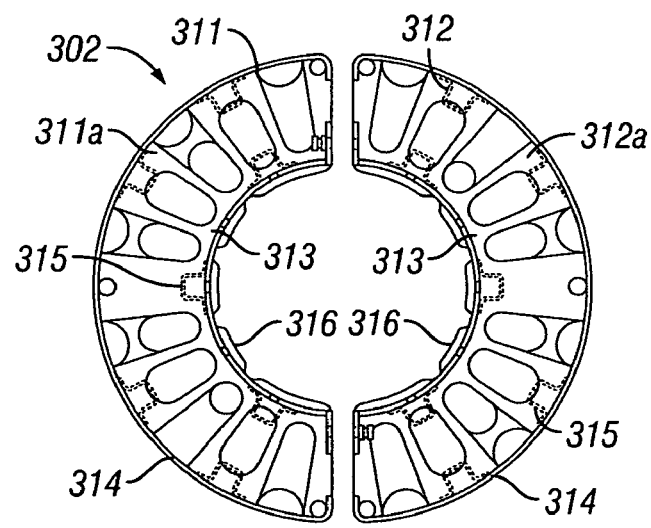
FIG. 11D

ENERGY MANAGING KEEL JOINT

BACKGROUND OF THE INVENTION

1. Field of the Invention

The present invention is directed to riser strings used with offshore rigs and vessels, keel joints used in various well operations, and to methods of their use.

2. Description of Related Art

Wellbore operations from floating vessels typically utilize risers or tendons in a string that extends from the vessel to the sea floor. Such floating vessels include tension buoyant towers, compliant towers, and spars in which the structures extend well below the sea surface and are subjected to heave, pitch, and roll motion at the surface. The risers and tendons are connected to the sea floor and pass through openings in the keel or bottom portion of the vessels. The openings in the vessels constrain the pipe forming the risers or tendons when the vessel is moved laterally with respect to the sea floor connection.

In many prior systems a special section of riser called a "keel joint" is used adjacent the keel of the hull: to accommodate the bending loads where the riser leaves the support of the platform; to accommodate the relative vertical movement between the riser and the hull; and to protect the riser string and the hull from damage. Several prior keel joints are reinforced to carry the bending loads imposed on the riser by the pitch/heel motions of the hull relative to the riser as well as the bearing and wear loads imposed on the riser by the vertical and lateral motions of the hull relative to the riser. Lateral movement can produce bending of the riser pipe at the hull opening, or rotation of the riser pipe about the contact of the riser pipe with the edges of the opening. Bending of the pipe, which is normally under tension, can result in fatigue and wear at the opening.

The prior art includes a variety of patents directed to vessels, risers and keel joints, including, but not limited to, U.S. Pat. Nos. 4,634,314; 5,377,763; 5,628,586; 5,683,205; 6,422,791; 6,739,395; 6,746,182; 7,013,824; 7,144,048; and 7,217,067—all incorporated fully herein for all purposes. Certain prior systems include the use of thick-walled pipes with tapered ends. These thick, tapered wall sections have been machined from heavy forgings and can be relatively expensive. Another solution utilizes a sleeve member centralized within the vessel opening and a mud line or sea floor connection to receive the lower end of the pipe. The pipe is centralized within the sleeve but otherwise unattached to the sleeve. Other approaches use a centralizing, ring-like device and/or a ball joint, located between the side walls of the vessel opening and the pipe.

U.S. Pat. No. 5,683,205 discloses a joint that passes through the vessel opening and is connected to the sea floor with the pipe centralized within an outer sleeve with large elastomeric rings located at each axial end of the sleeve. U.S. Pat. No. 6,422,791 discloses a sleeve positioned around a riser pipe where the pipe penetrates the keel of the platform. The riser-to-sleeve attachment provides a load carrying capacity in both the axial and lateral direction (or reduced capacity in one of these directions) and permits flexibility for angular offsets between an outer sleeve and a riser pipe.

U.S. Pat. No. 7,217,067 discloses a riser joint keel assembly in which a tapered riser joint is connected to a larger diameter outer sleeve through a connection that allows the tapered section and outer sleeve to function as one unit. In the combined design, the outer sleeve provides the required sliding interface between the riser and the guide at the keel of the hull while also providing some of the bending compliance needed to transition from the riser supported in the hull to the riser unsupported below the hull. The tapered section also provides the remaining bending compliance needed for the transition. The connection between the tapered and sleeve sections is a forged, machined ring plate welded to the bottom end of the sleeve, which provides a base for either bolted or threaded type attachment points for the tapered riser joint below the ring plate and the internal riser joint that continues to the surface. In one aspect such an assembly for a floating offshore structure with a top-tensioned riser arrangement, includes a compliant riser keel joint assembly, including: a. an outer sleeve positioned inside two keel guides in the hull structure; b. an internal riser joint positioned in said sleeve and having a flange attached at the lower end; c. a centralizer mounted inside said outer sleeve adjacent the upper end and sized to receive said internal riser joint; d. a single, tapered riser joint positioned below said internal riser joint; and e. means for connecting the lower end of said internal riser joint to the upper end of said single-tapered riser joint, including i. said internal riser joint having a threaded lower end; ii. a flange attached to the upper end of said tapered riser joint; and iii. a machined ring attached to said sleeve, said ring having a threaded bore sized to threadably receive the internal riser joint and providing the attachment point for the flange on the tapered riser joint.

U.S. Pat. No. 7,013,824 discloses a riser centralizer for transferring lateral loads from the riser to a platform hull with a keel centralizer mounted on a keel joint. The keel centralizer is received within a keel guide sleeve secured in a support mounted at the lower end of the platform hull. The keel centralizer includes a nonmetallic composite bearing ring having a radiused peripheral profile for minimizing contact stresses between the keel centralizer and the keel guide sleeve in extremes of riser and platform motion. The internal surface of the keel guide sleeve is clad with a corrosion resistant alloy and coated with a wear resistant ceramic rich coating. In one aspect, there is keel centralizer that includes: a. a flat keel centralizer body having a central bore extending through said body; b. the keel centralizer body including a circumferential flange member defining the perimeter thereof; c. at least one opening extending through the keel centralizer body; d) a bearing ring mounted on the flange member; and e) a keel sleeve mounted in a keel support frame, the keel sleeve being adapted for slidably receiving the keel centralizer body, and wherein the keel sleeve is clad with a corrosion resistant material.

U.S. Pat. No. 6,746,182 discloses keel joint assemblies that permit a degree of rotational movement of a riser within the keel of a floating vessel and greatly reduce the amount of stress and strain that is placed upon the riser, as well. Keel joint assemblies described provide a limiting joint between the riser and the keel opening that permits some angular rotation of the riser with respect to the floating vessel. Additionally, the limiting joint permits the riser to move upwardly and downwardly within the keel opening, but centralizes the riser with respect to the keel opening so that the riser cannot move horizontally with respect to the keel opening. In certain embodiments, the limiting joint is provided by a single annular joint that allows that riser to move angularly with respect to the can. In some embodiments, the keel joint assembly incorporates a cylindrical stiffening can that radially surrounds a portion of the riser and is disposed within the keel opening. In these embodiments, a flexible joint is provided between the can and the riser. Supports or guides may be used to retain the can within the keel opening. In one aspect, in floating platform, there is: a hull having a bottom and a deck spaced above the bottom; a riser opening extending generally vertically through the hull from the bottom to the deck; a riser extending through the riser opening; a landing profile in the riser opening adjacent to the bottom of the hull; a guide sleeve having an engagement profile that lands and locks on the landing profile for movement with the hull; and a collar being located with the guide sleeve and having a flex member having a central passage through which the riser extends, the flex member being supported by the guide sleeve adjacent to the bottom of the hull, the flex member being movable axially relative to an axis of the riser and allowing angular movement of the guide sleeve relative to the riser.

U.S. Pat. No. 6,422,791 discloses an attachment that extends between an outer sleeve and an inner riser pipe where the pipe penetrates the keel of a platform. In one version, the attachment is a conically-shaped with a small diameter ring that engages the riser pipe and a large diameter ring that engages the outer sleeve. This attachment has elements that are very flexible in bending but relatively stiff and strong in axial load. Other versions include flat rings where lateral load is taken directly into tension and compression in the beams, allowing for relatively high lateral load transfer. Both the conically-shaped attachment and the flat ring have a number of variations that provide low bending stiffness but high axial stiffness of the elements. Depending on whether resistance to axial loads, lateral loads, or resistance to combination of both loads is desired, the attachment and the flat ring may be used alone or in combination. Other variations of the device provide two opposing conical shaped attachments or a conical and flat ring attachment installed together to provide load capability in both axial and lateral directions while still providing angular flexibility. In one aspect there is a riser joint for a riser extending between a floating vessel and a sea floor, the riser joint including: a tubular member having an axis; a sleeve surrounding a portion of the tubular member and having an upper end, a lower end, and a sleeve axis that substantially aligns with the axis of the tubular member; a metal upper element adjacent to the upper end of the sleeve, and having a first portion mounted to the sleeve, and a second portion mounted to the tubular member, wherein the first and second portions of the upper element are axially spaced apart; a metal lower element adjacent to the lower end of the sleeve, and having a first portion mounted to the sleeve, and a second portion mounted to the tubular member, wherein the first and second portions of the lower element are axially spaced apart; and wherein the upper and lower elements have apertures therein between the first and second portions to allow angular and radial flexibility of the tubular member relative to the sleeve and resist axial motion of the tubular member relative to the sleeve.

U.S. Pat. No. 4,634,314 discloses composite marine riser system which, in certain aspects, include tubular marine riser sections formed by a wound or woven filament-resin matrix tubular body having a modulus of elasticity in tension of about 27,000,000 psi or greater utilizing carbon or boron for the filament material. The riser sections may be provided with end couplings secured to the tubular body for forming a riser system wherein the tensile strength or load bearing capacity of each section and its hydrostatic collapse resistance may be selectively determined by its position in the riser system. The riser sections may be provided with cylindrical collapse resisting ribs defining spaced buoyancy chambers filled with low density material contained by an outer shell formed of a glass or aramid fiber-resin matrix composite having a lower modulus of elasticity in tension than the primary load bearing tubular member. An inner abrasion and fluid impervious sleeve is disposed within the tubular body but is not bonded thereto. Multiple conduit riser sections may be utilized as anchoring members for a floating platform and the like. In one aspect there is a marine riser for use in drilling or production of hydrocarbons from a subsea formation including: elongated tubular body means constructed of a composite of elongated filaments of a material in a resin matrix having a modulus of elasticity not less than about $27.\text{times}.10.\text{sup}.6$ psi, said filaments being bonded in a resin matrix to form a load bearing member of the tubular body means having an elastic elongation strain characteristic under stress in tension not substantially greater than steel; and coupling means at opposite ends of the tubular body means for coupling the riser to a member for transmission of tensile loads through the tubular body means between said ends.

BRIEF SUMMARY OF THE PRESENT INVENTION

The present invention, in at least certain aspects, provides a keel joint protector with a body made of flexible material, a central open bore through the body, and the body having a plurality of spaced-apart energy management zones therein for diffusing a force applied to a particular part of the body.

A force or load that encounters an energy management zone in an apparatus according to the present invention is defocused in the sense that the force or load goes around the zone Thus a concentrated or point-applied force or load is diffused and distributed.

In certain aspects, the present invention teaches a keel with: a riser pipe; a plurality of keel joint protectors on the riser pipe including at least one pair of keel joint protectors,; each of the plurality of keel joint protectors having a body made of flexible material, a central open bore through the body, the body having a plurality of spaced-apart energy management zones; a support ring between each pair of keel joint protectors; and, optionally, a protective shell over the keel joint protectors and support rings.

In certain aspects, the present invention teaches methods for protecting a hull of a rig adjacent a keel joint, the keel joint extending through an opening in the hull, the methods including: positioning a keel joint with respect to a hull, the keel joint extending through an opening in the hull, the keel joint like any disclosed herein according to the present invention, e.g., one having a body made of flexible material, a central open bore through the body, the body having a plurality of spaced-apart energy management zones, and contacting the hull with the keel joint so that a force is applied to the body of the keel joint and the force's effects on the hull is diffused.

The present invention, in certain embodiments, discloses centralizers for centralizing a tubular, e.g. in a wellbore or in another tubular, the centralizers, in certain aspects, including: a body made of flexible material; a central open bore through the body; the body having a plurality of spaced-apart energy management zones.

Accordingly, the present invention includes features and advantages which are believed to enable it to advance keel joint and centralizer technology. Characteristics and advantages of the present invention described above and additional features and benefits will be readily apparent to those skilled in the art upon consideration of the following detailed description of preferred embodiments and referring to the accompanying drawings.

Certain embodiments of this invention are not limited to any particular individual feature disclosed here, but include combinations of them distinguished from the prior art in their structures, functions, and/or results achieved. Features of the invention have been broadly described so that the detailed descriptions that follow may be better understood, and in order that the contributions of this invention to the arts may be better appreciated. There are, of course, additional aspects of the invention described below and which may be included in the subject matter of the claims to this invention. Those skilled in the art who have the benefit of this invention, its teachings, and suggestions will appreciate that the conceptions of this disclosure may be used as a creative basis for designing other structures, methods and systems for carrying out and practicing the present invention. The claims of this invention are to be read to include any legally equivalent devices or methods which do not depart from the spirit and scope of the present invention.

What follows are some of, but not all, the objects of this invention. In addition to the specific objects stated below for at least certain embodiments of the invention, there are other objects and purposes which will be readily apparent to one of skill in this art who has the benefit of this invention's teachings and disclosures. It is, therefore, an object of at least certain preferred embodiments of the present invention to provide the embodiments and aspects listed above and:

New, useful, unique, efficient, non-obvious keel joints, vessels with such keel joints, and methods of their use; and Such systems with riser protectors with a plurality of energy management zones.

The present invention recognizes and addresses the problems and needs in this area and provides a solution to those problems and a satisfactory meeting of those needs in its various possible embodiments and equivalents thereof. To one of skill in this art who has the benefits of this invention's realizations, teachings, disclosures, and suggestions, various purposes and advantages will be appreciated from the following description of preferred embodiments, given for the purpose of disclosure, when taken in conjunction with the accompanying drawings. The detail in these descriptions is not intended to thwart this patent's object to claim this invention no matter how others may later attempt to disguise it by variations in form or additions of further improvements.

The Abstract that is part hereof is to enable the U.S. Patent and Trademark Office and the public generally, and scientists, engineers, researchers, and practitioners in the art who are not familiar with patent terms or legal terms of phraseology to determine quickly from a cursory inspection or review the nature and general area of the disclosure of this invention. The Abstract is neither intended to define the invention, which is done by the claims, nor is it intended to be limiting of the scope of the invention or of the claims in any way.

It will be understood that the various embodiments of the present invention may include one, some, or all of the disclosed, described, and/or enumerated improvements and/or technical advantages and/or elements in claims to this invention.

BRIEF DESCRIPTION OF THE SEVERAL VIEWS OF THE DRAWING

A more particular description of embodiments of the invention briefly summarized above may be had by references to the embodiments which are shown in the drawings which form a part of this specification. These drawings illustrate certain preferred embodiments and are not to be used to improperly limit the scope of the invention which may have other equally effective or legally equivalent embodiments.

FIG. 6A is a side view of an eyebolt mounting block of the protector of FIG. 3A.

FIG. 6B is a front view of the eyebolt mounting block of FIG. 6A.

FIG. 7A is a side view of a safety cable mounting block of the protector of FIG. 3A.

FIG. 7B is a front view of the safety cable mounting block of FIG. 6A.

FIG. 8A is a top view of a mounting bracket of the protector of FIG. 3A.

FIG. 8B is a side view of the mounting bracket of FIG. 8A.

FIG. 8C illustrates top views of various shapes of brackets for supports according to the present invention.

FIG. 9A is a side view of a mounting block of the protector of FIG. 3A.

FIG. 9B is a top view of the mounting block of FIG. 9A.

FIG. 10 is a perspective view of a body part of a protector according to the present invention.

FIG. 10A illustrates top views of various shapes for an energy management zone according to the present invention.

FIG. 11A is a side view of a protector according to the present invention.

FIG. 11B is a side view of locking bars according to the present invention for securing together two protectors according to the present invention.

FIG. 11C is a side view of a protector according to the present invention.

FIG. 11D is a top view (or bottom view) of the protectors of FIGS. 11A and 1C.

Figure 1:
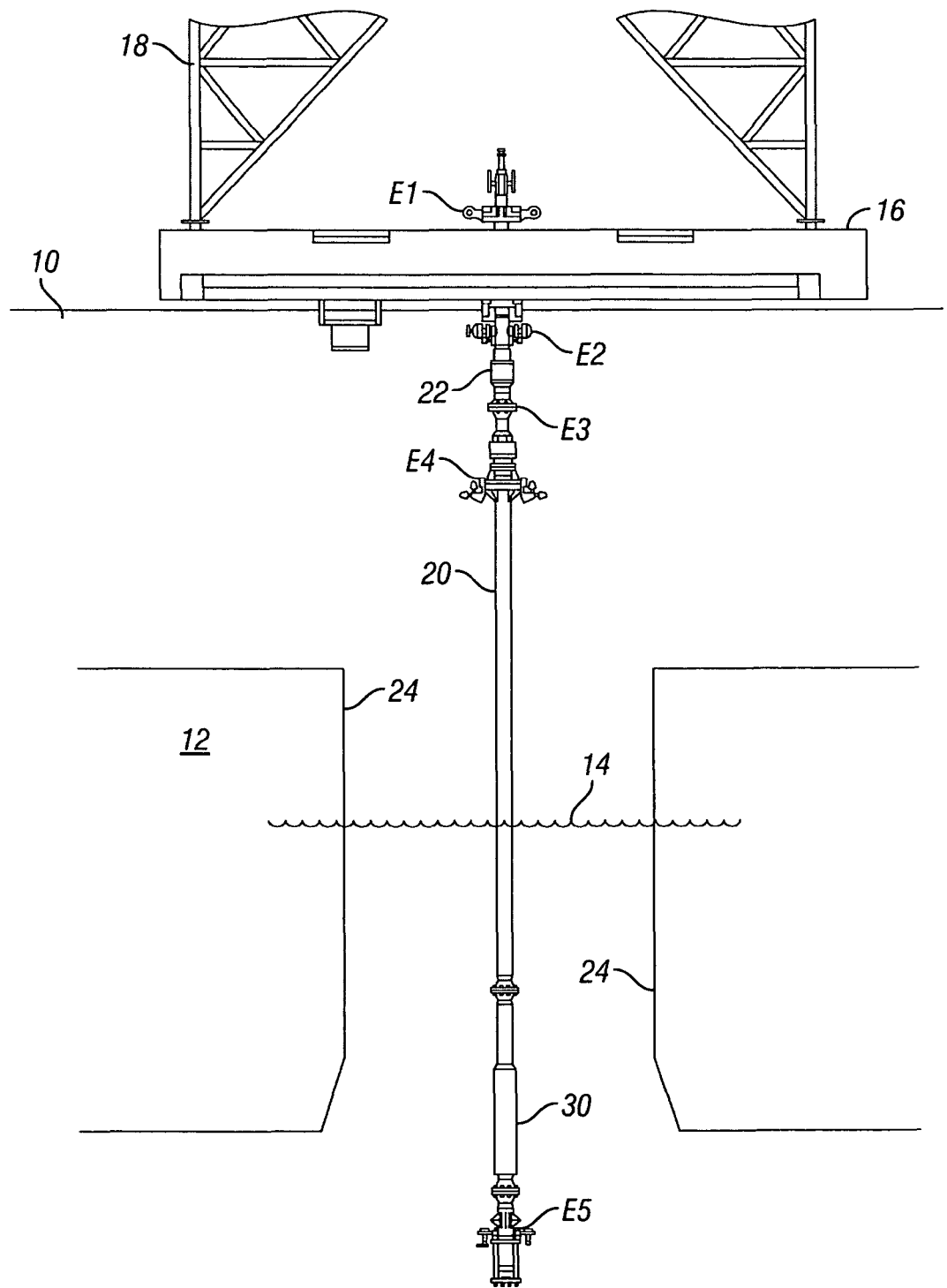
FIG. 1 is a side schematic view of a system according to the present invention.

Presently preferred embodiments of the invention are shown in the above-identified figures and described in detail below. It should be understood that the appended drawings and description herein are of preferred embodiments and are not intended to limit the invention or the appended claims. On the contrary, the intention is to cover all modifications, equivalents and alternatives falling within the spirit and scope of the invention as defined by the appended claims. In showing and describing the preferred embodiments, like or identical reference numerals are used to identify common or similar elements. The figures are not necessarily to scale and certain features and certain views of the figures may be shown exaggerated in scale or in schematic in the interest of clarity and conciseness.

As used herein and throughout all the various portions (and headings) of this patent, the terms "invention", "present invention" and variations thereof mean one or more embodiments, and are not intended to mean the claimed invention of any particular appended claim(s) or all of the appended claims. Accordingly, the subject or topic of each such reference is not automatically or necessarily part of, or required by, any particular claim(s) merely because of such reference. So long as they are not mutually exclusive or contradictory any aspect or feature or combination of aspects or features of any embodiment disclosed herein may be used in any other embodiment disclosed herein.

DETAILED DESCRIPTION OF THE INVENTION

FIG. 1 illustrates a floating drilling vessel 10 according to the present invention which has a hull 12 in water up to a waterline 14. A riser string 20 extends from a deck 16 into the water. A derrick 18, shown partially, on the deck 16 is a typical wellbore operations derrick. Typical well operations equipment $E_1$, $E_2$, $E_3$, $E_4$, $E_5$ is used with the riser string (any suitable known equipment for any wellbore operations). The riser string pivot 22 permits the riser string 20 to pivot.

A keel joint 30 according to the present invention is located in the riser string 20 for contacting sides 24 of a moonpool of the hull 12. The keel joint 30 may be any keel joint according to the present invention disclosed herein.

Figure 2A:
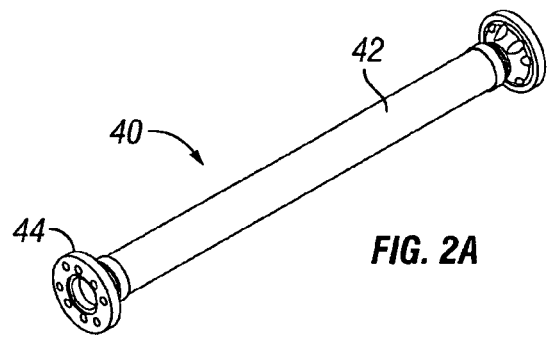
FIG. 2A is a perspective view of a pipe used in the keel joint according to the present invention shown in FIG. 2B.
Figure 2B:
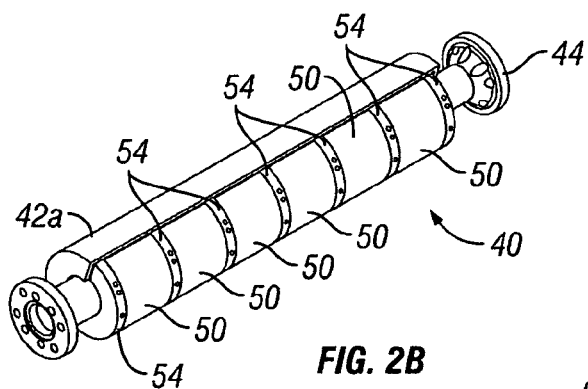
FIG. 2B is a perspective view of a keel joint according to the present invention.

FIGS. 2A and 2B shows a keel joint 40 according to the present invention which has a plurality of protectors 50 according to the present invention on a riser 44 covered by a shell 42. The shell 42 has two halves, 42a and 42b (one shown in FIGS. 2B, 2C), which are bolted, fastened, welded, and/or glued in place. Optionally, the shell 42 is a single hollow cylinder. Rings 54 between the protectors 50 hold together two halves, 50a, and 50b, of each protector 50. In one aspect, each pair of halves 50a, 50b are bolted together on the riser 44. The rings 54 (which may be split rings secured together) carry the weight of the protectors and hold them in position.

The protectors 50 may be any protector disclosed herein according to the present invention. Any desired number of protectors 50 may be used on the riser 44 (as is true for the number of protectors for any keel joint according to the present invention). In certain aspects according to the present invention, a riser or pipe of a keel joint is completely covered with protectors (e.g. as in FIG. 2B), while in other aspects only one protector is used or two or more spaced-apart protectors are used. In certain aspects the protectors are two-piece with the two pieces installed around the riser and secured together. When connected together, the protectors have a central open bore through which the riser passes. In other aspects, the protectors are a single integral item with a central bore in one aspect, molded in place on a tubular such as a riser.

As is true of any keel joint according to the present invention, the protectors 50, the rings 54, inner and outer supports, and/or the shells 42 may be made of plastic, foam, rubber, wood, metal (including, but not limited to, brass, bronze, steel, stainless steel, aluminum, aluminum alloy, zinc, zinc alloy), composite, fiberglass, nylon, and/or KEVLAR (TRADEMARK) material. In certain aspects the bodies of protectors like the protectors 50 (and any protector according to the present invention) are made from flexible material, e.g., but not limited to, flexible urethanes and polyurethanes. Optionally, the shell 42 may be molded in place on a riser or formed of two (or more) parts secured together on a riser. Optionally a protector 50 (and any protector disclosed herein) can be a single integral item.

Figure 2C:
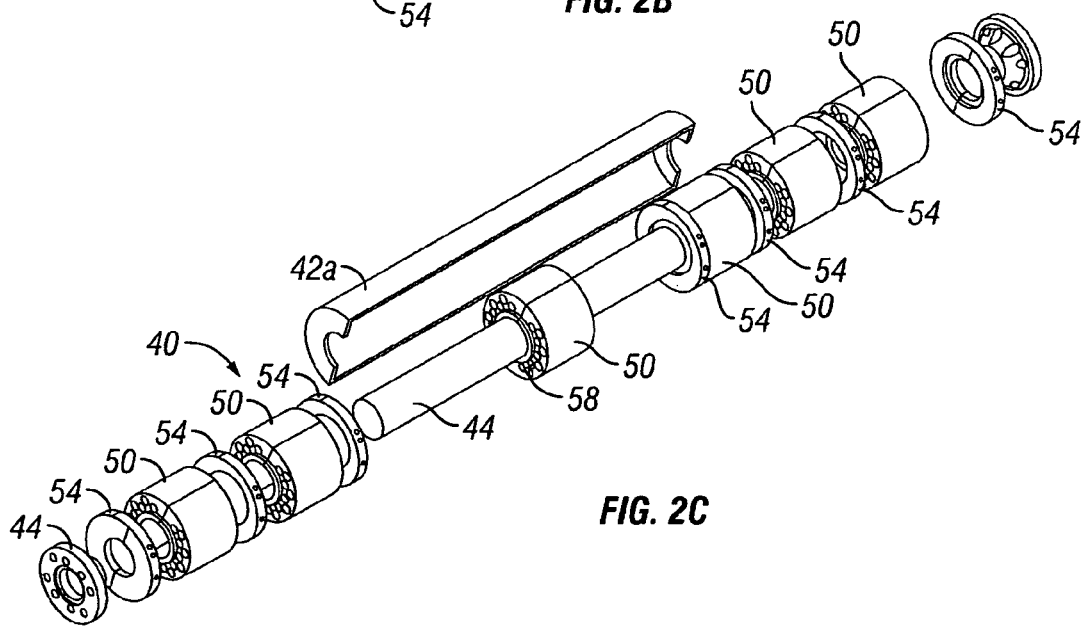
FIG. 2C is an exploded perspective view of the keel joint of FIG. 2B.

As shown in FIG. 2C the protectors 50 each have a series of cells, holes, zones and/or openings 58. Any such zones, cells, etc. disclosed herein according to the present invention may be used. The rings 54 may have grooves or recesses for receiving and holding a protector or part of a protector.

Figure 3A:
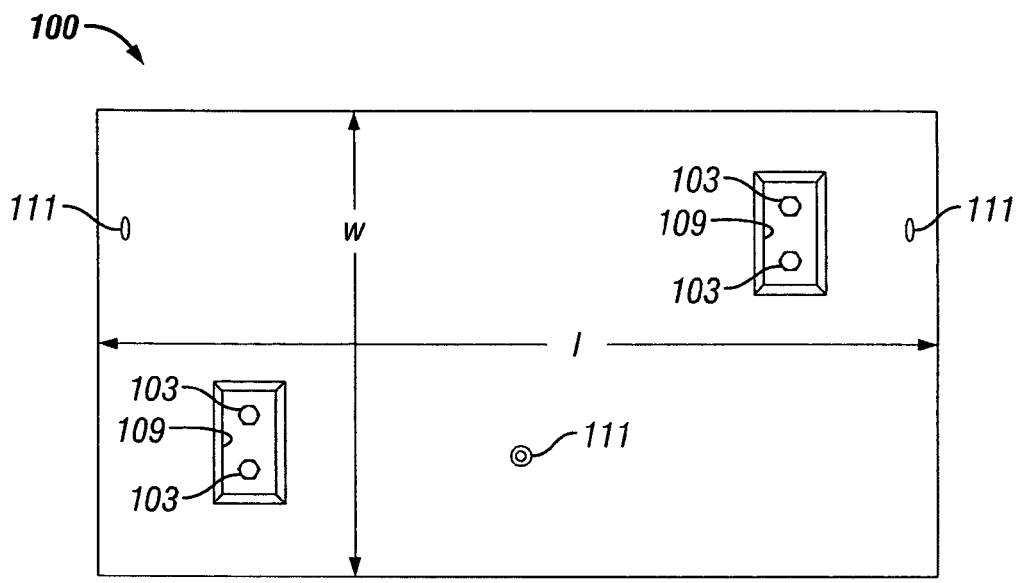
FIG. 3A is a side view of a protector according to the present invention.
Figure 3B:
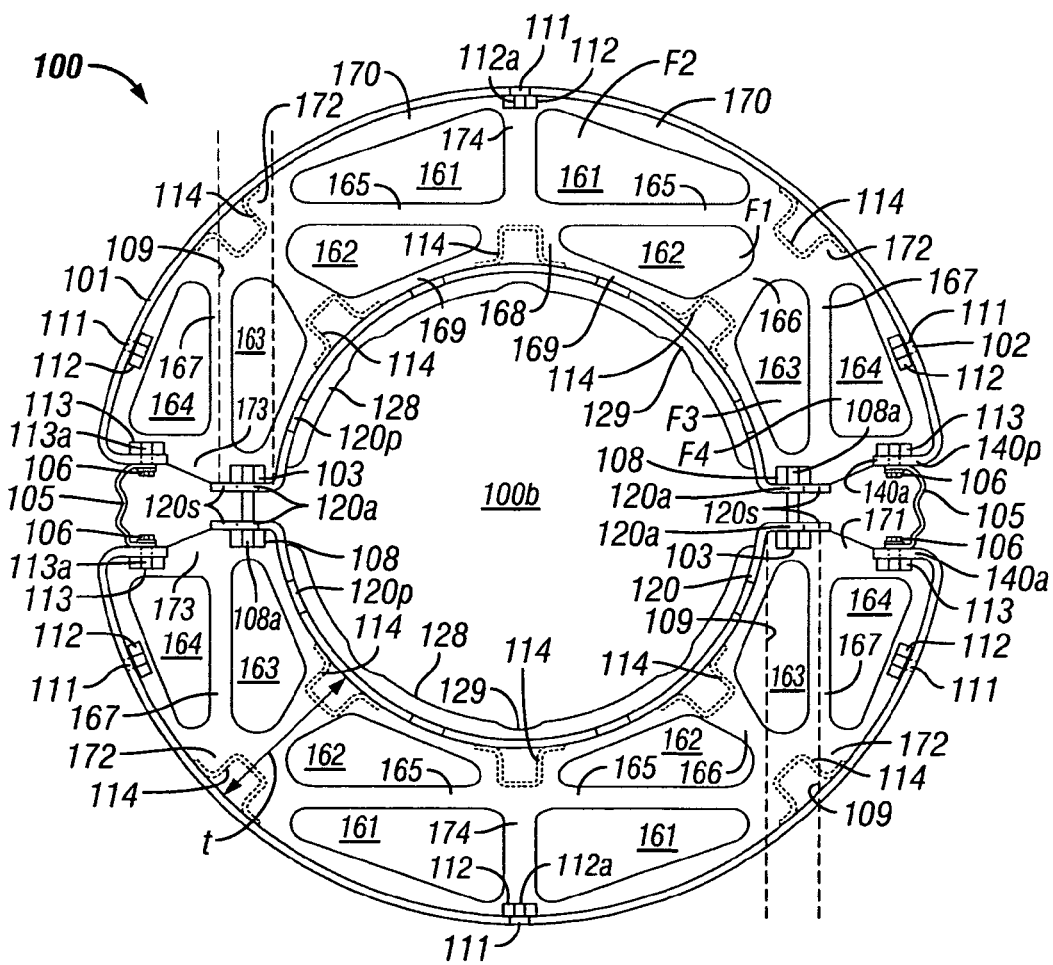
FIG. 3B is a top view of the protector of FIG. 3A.

FIGS. 3A and 3B show a protector 100 according to the present invention which may be used in any keel joint according to the present invention. The protector 100 has a central open bore 100b therethrough. The protector 100 has two halves 101, 102 releasably secured together by securing together lips 120s with bolts 103, threadedly secured in corresponding holes 108a in nuts 108 each on an inner support 120. An outer support 140 is spaced-apart from the inner support 120. Optionally, the two halves 101, 102 are also releasably held together by one, two, or more members 105 each secured by bolts 106/nuts 107 to an outer support 140 through holes 140a in lips 140p. The lips 140p wrap around and are adjacent edges of the halves 101, 102. The members 105 may be any suitable rigid (e.g. but not limited to metal plates or bars) or flexible member (e.g., but not limited to, springs, corrugated metal, cables, etc.). As shown in FIG. 3B, the members 105 are pieces of flexible stainless steel cable. Optionally, the bolts 103 are deleted. Optionally, the bolts 103 are deleted and bolts (not shown) at the location of the members 105 releasably hold the two halves 101, 102 together. The bolts 103 are accessible through channels 109.

As is true of any keel joint disclosed herein according to the present invention, the inner support 120 and any inner supports and outer supports) can be made of any suitable material, including, but not limited to, metal, plastic, composite or fiberglass. In certain aspects an optional interior ridge member 128 is provided on each inner support 120 for contacting a riser on which a protector with such inner supports is installed. In certain aspects, the ridge members 128 are made of non-conductive material that does not conduct electricity, e.g., but not limited to fiberglass, plastic, foam, or polyurethane to reduce or inhibit galvanic corrosion. Optionally ridge members, with recesses 120, inhibits or prevents metal/metal contact between a riser (or other tubular) and metal of the protector 100 (especially in the event of corrosion of a metal part). This also prevents metal/metal corrosion. The recesses 120 provide space into which material under load can move.

Channels 109 provide access to bolts 103. Eyebolt holes 111 are adjacent corresponding holes 112a in eyebolt mounting blocks 112. The eyebolt mounting blocks provide lift points and attachment points. The bolts 106 extend through the outer supports 140 and threadedly mate with corresponding holes 113a in mounting blocks 113 which are secured to the outer supports (e.g. with epoxy and/or welding). Openings or gaps 120p permit material flow during production process, e.g. a molding process, to produce the halves 101, 102. Material can remain within the gaps following production.

Figure 4A:
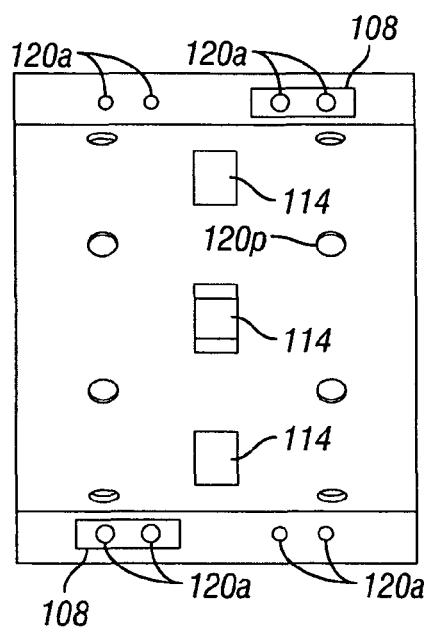
FIG. 4A is a side view of an inner support of the protector of FIG. 3A.
Figure 4B:
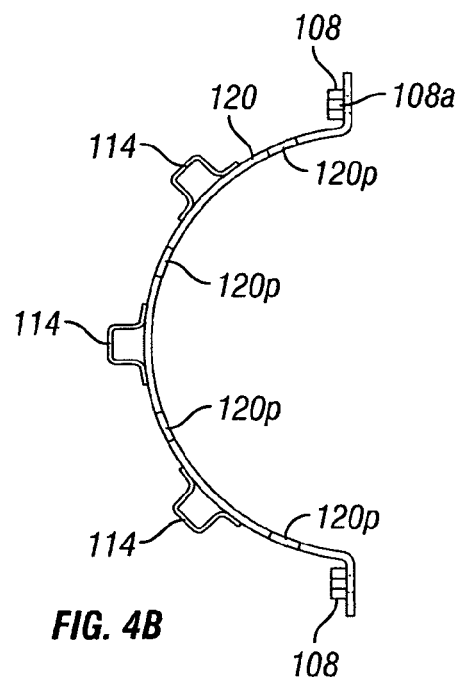
FIG. 4B is a top view of the inner support of FIG. 4A.
Figure 5A:
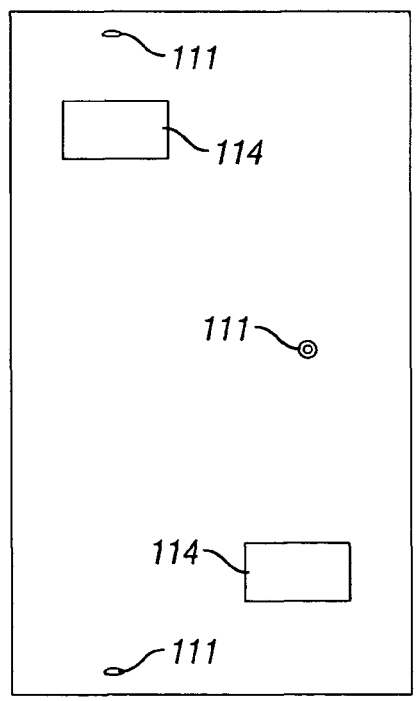
FIG. 5A is a side view of an outer support of the protector of FIG. 3A.
Figure 5B:
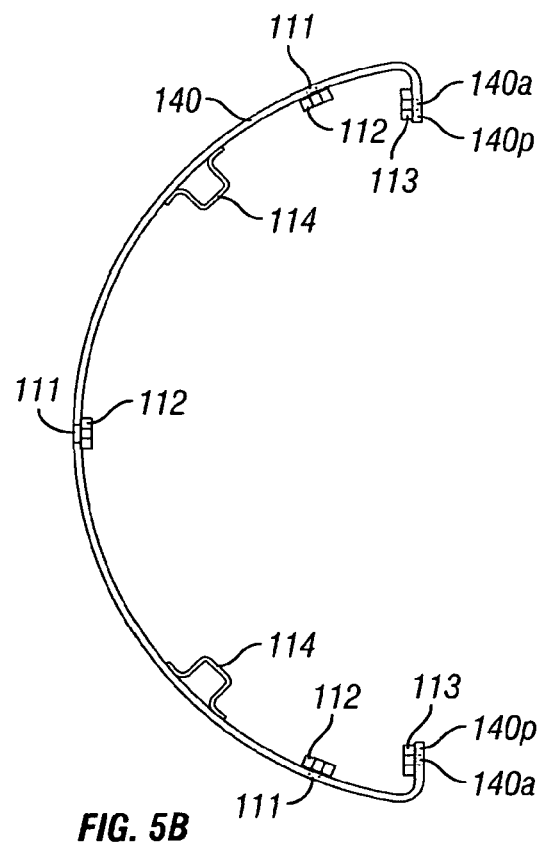
FIG. 5B is a top view of the outer support according to the present invention of FIG. 5A.

Optionally bodies 101a, 102a of the halves 101, 102 are formed or made with one, two, three, four, five, six or more inner retaining brackets 114. In one aspect, these brackets 114 are completely encased within material (e.g. plastic, rubber, foam, fiberglass or composite) that is used to make the halves 101, 102. The inner support 120 may be connected to the outer support 140 or, as shown, the two are not connected together (other than by body material between them); thus desirable movement of the inner support with respect to the outer support is possible, which facilitates energy management. The mounting blocks 108 are shown in FIGS. 4A and 4B.

Each half 101, 102 has a plurality of energy management zones 161, 162, 163, 164 defined by ribs 165, 166, 167, 174 and by parts 168, 169, 171, 172, 173 of the bodies 101a, 102a. It is within the scope of the present invention for the energy management zones to each have a floor F1, F2, F3, F4, i.e., these zones are not holes or channels which extend all the way through the bodies 101, 102 from one side to the other or from one end to the other. These floors F1-F4 are below a surface of the bodies 101, 102. The depth of each energy management zone can be the same or, according to the present invention, depths of different zones can be different. In one particular embodiment, the energy management zones 162 are three inches deep with a two degree side taper in a body that is 28 inches wide ("w", FIG. 3A), 49.3 inches long ("l," FIG. 3A) and about 10 inches thick ("t," FIG. 3B). In such a body, the energy management zones 163 are 11 inches deep, the energy management zones 161 and 164 are 13 inches deep, the ribs 165, 167 are about 1.7 inches thick, the ribs 174 are about 1.8 inches thick.

The outer support 140 can be within the body of the protector or, as shown in FIG. 3B, can be on the outside of the protector. The inner support 120 can, as shown in FIG. 3B, be within the protector, or can be outside.

FIG. 10 shows a protector half 200 according to the present invention for use with any protector disclosed herein according to the present invention. The half 200 has a body 202 with a plurality of energy management zones 211, 212, 213, 214; ribs 216, 217, 218; body parts 221, 222, 223, 224 and ends 225, 226. An inner support 238 (like any inner support disclosed herein) with or without brackets (like the brackets 114) is spaced-apart from an outer support 240, like any outer support disclosed herein, with or without brackets (like the brackets 114). The inner support 238 has lips 238a which are adjacent and wrap around edges of the body 202. The outer support 240 has lips 240a that are adjacent and wrap around edges of the body 202. FIG. 10 shows the top of the body 202. The bottom (not shown) has corresponding energy management zones which are the same as the energy management zones, ribs, body parts and ends shown for the top. The energy management zones of top and bottom all have floors and, e.g., the energy management zones 212 on the top are spaced-apart from the corresponding zones 212 on the bottom by part of the body 202 so that corresponding top and bottom zones are not in communication with each other (i.e., fluid cannot flow from a top zone to a corresponding bottom zone). In one aspect the protector half 200 is made of polyurethane.

In use, the various energy management zones of the protector 200 (and of any protector according to the present invention with a plurality of adjacent energy management zones) act as deformable crumple zones which absorb an impact and facilitate the distribution of the force of an impact from an impact point or area to other portions of the protector.

In certain methods of use, according to the present invention, of protectors according to the present invention the protectors are secured to the riser adjacent moonpool sides with the protector seams (the plane at which ends of adjacent protector halves meet) perpendicular to the moonpool sides so that relatively large body parts (e.g. body parts 222, FIG. 10) will abut the moonpool sides in the event of keel-joint/moonpool-side contact. In certain aspects with such a positioning of a protector, force initially applied at such a body part (e.g. the body parts 222, 224, FIG. 10) is distributed over a portion of the protector which includes additional parts of the body in addition to the body part at which the initial impact occurs. In certain aspects it is desirable that the protector be positioned so that a point of impact will be at or near a protector part at which protector material extends all the way from the protector outer surface to the protector inner surface (e.g. see adjacent body parts 222, 224; and rib 216 and part 221). In one particular aspect such an initial impact is distributed over, about one fourth of the entire protector's body (e.g., with a protector that has an outer circumference of about one hundred fifty seven inches, and a height of about twenty-six inches). Thus by using body parts (like the body parts 221, 222, 224, FIG. 10) with ribs (like the ribs 217, 218, FIG. 10) localized contact forces are distributed over a larger area than the area of initial contact. In certain particular cases in which a distribution to one-fourth of the protector is achieved, no brackets (like the optional brackets 114) are used. By using such brackets, it is believed greater and more efficient, force distribution will be achieved and separation of a body, e.g. separation of a urethane body from steel inner and outer supports, will be inhibited or reduced.

In one aspect of the protector 200, zone depth in inches is as follows: zones 211, 11 inches; zones 212, 13 inches; zones 213 13 inches; and zones 214, 3 or 11 inches.

It is within the scope of the present invention to employ energy management zones which, viewed from above, are generally triangular (like the zones 211-214, FIG. 10) with bases of adjacent zones adjacent each other, with apices of adjacent zones opposite each other (see apex a and apex b, FIG. 10). Optionally, each pair of generally triangular zones is spaced-apart from each other pair by a relatively large body part (e.g. see body parts 222, 224, FIG. 10) or by a relatively large body part and a rib (e.g., see body part 221 and rib 216, FIG. 10). Optionally, a relatively large body part has a plurality of spaced-apart ribs radiating from it (e.g. see ribs 217 and 218 with respect to body part 222, FIG. 10; see, ribs 217, 216, 217 with respect to body part 221, FIG. 10). Optionally, at an area of expected impact energy management zones are adjacent a relatively large body mass (e.g. see zones 212, 211, 214, 213 adjacent a mass including body parts 222, 224, FIG. 10), a relatively large mass which extends fro an outer surface of the body to an inner surface thereof. It is within the scope of the present invention for the shape of the energy management zones, as viewed from above, to be any suitable shape, including, but not limited to, square, rectangular, pentagonal, hexagonal, or seven-sided, with or without rounded-off corners, e.g., as those shown in FIG. 10A.

The brackets 114, shown in FIGS. 8A, 8B and 3B, serve as mechanical anchors for the body material of a protector half. It is within the scope of the present invention for these anchors to be any suitable shape or size so long as they protrude from their respective support sufficiently to anchor the body to the support. FIG. 8C shows several alternative shapes for these anchoring brackets, as viewed from above. In use within a body of a protector, a portion, in some cases a substantial portion, of these anchoring brackets is encased in the material of the body of a protector.

Any energy management zone of any keel joint or centralizer according to the present invention may extend all the way through the protector or centralizer body. For protectors according to the present invention or centralizers according to the present invention, halves thereof may be secured together by frangible members and/or shear bolts which break under a certain predetermined load.

In certain aspects, a keel joint according to the present invention has a body having a first primary body part, a second primary body part, a third primary body part, and a fourth primary body part (primary body parts like the parts 222, FIG. 10); the plurality of spaced-apart energy management zones (e.g. as in the protector 200) including a plurality of first zones, a plurality of second zones, a plurality of third zones, and a plurality of fourth zones; the plurality of first zones projecting inwardly of the body from the first primary body part (e.g. the zones 211, 212, 213, 214, FIG. 10) and the plurality of second zones projecting inwardly of the body from the second primary body part (e.g. the zones 211, 212, 213, 214, FIG. 10); the plurality of third zones projecting inwardly of the body from the third primary body part (e.g. the zones 211, 212, 213, 214, FIG. 10); and the plurality of fourth zones projecting inwardly of the body from the fourth primary body part (e.g. the zones 211, 212, 213, 214, FIG. 10). In such a keel joint the body has a central open bore therethrough (e.g. bore 100, FIG. 3B or a bore formed between two halves as shown in FIG. 10); an inner support (e.g. support 120, FIG. 3B or support 238, FIG. 10); an outer support (e.g. support 140, FIG. 3B or support 240, FIG. 10A); the inner support spaced-apart from the outer support; and a secondary body part extending from each primary body part to an inner support (e.g. the part 224, FIG. 10 or the rib 166, FIG. 3B). In such a keel joint, in certain aspects, there is a bracket in each primary part and encased therein (e.g. a bracket 114 on the support 140, FIG. 3B); and a bracket in each secondary part and encased therein (e.g. a bracket 114 on the support 120, FIG. 3B).

In certain aspects, a keel joint according to the present invention has a first half having a first inner support and a first outer support and a second half having a second inner support and a second outer support (e.g., the two halves 101, 102, FIG. 3B); each inner support having a first end and a second end; a first inner lip on the first end of the first inner support adjacent an edge of the first body half, a second inner lip on the second end of the first inner support each adjacent an edge of the first body half, a third inner lip on the second inner support adjacent an edge of the second body half, a fourth inner lip on the second inner support adjacent an edge of the second body half (see, e.g., lips 120s, FIG. 3B); a first outer lip on the first outer support adjacent an edge of the first body half, a second outer lip on the first outer support adjacent an edge of the first body half, a third outer lip on the second outer support adjacent an edge of the second body half, and a fourth outer lip on the second outer support adjacent an edge of the second body half (outer lips e.g. the lips 140p, FIG. 3B).

Figure 11E:
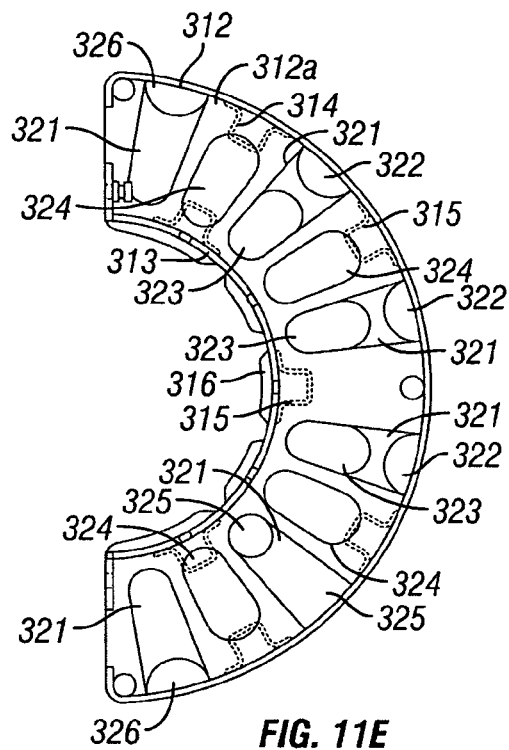
FIG. 11E is an end view of half of one of the protectors of FIG. 11D.
Figure 11F:
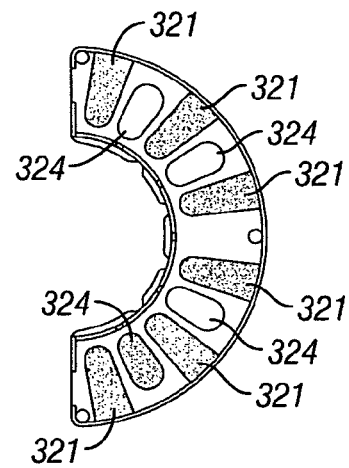
FIG. 11F is a schematic view of the protector half of FIG. 11E.

In certain aspects, a keel joint according to the present invention has a plurality of energy management zones, each energy management zone having a depth and a plurality of adjacent energy management zones having different depths (e.g. the zones from a one o'clock to a three o'clock position as viewed in FIG. 11F). In certain aspects a keel joint according to the present invention has a plurality of the spaced-apart energy management zones each having portions therein with different depths (e.g. the zones 321 with zones 326 therein, FIGS. 11F and 11G).

FIGS. 11A-11C show an exploded view of two protectors 300, 302 according to the present invention (which may be any protector according to the present invention) which are joined together by pins 304 or bars which have portions that extend with a friction fit into holes 306, 308 of the adjacent protectors 300, 302.

FIG. 11D shows an end view of one embodiment of the protector 302. The protector 302 as shown in FIGS. 11D and 11E has two halves 311, 312 each with an inner support 313 and an outer support 314, each with a plurality of anchor brackets 315 and bodies 311a, 312a, respectively anchored to the brackets 315 and made, in one aspect, of polyurethane which is bonded to the inner surfaces of the supports 313, 314. A plurality of spaced-apart ridge members 316 made of polyurethane or some other non-electrical-conductor material encircle the circle formed by inner surfaces of the inner supports 313. The halves 311, 312 may be releasably secured together around a riser with any securement structure disclosed herein.

Figure 11G:
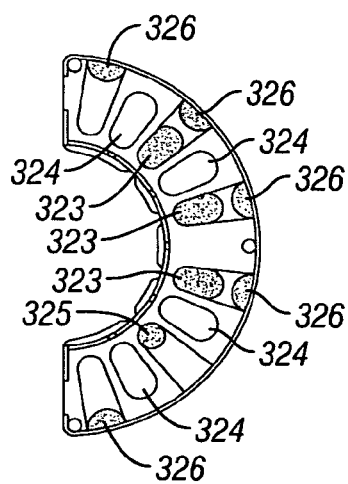
FIG. 11G is a schematic view of the protector half of FIG. 11E.
Figure 11H:
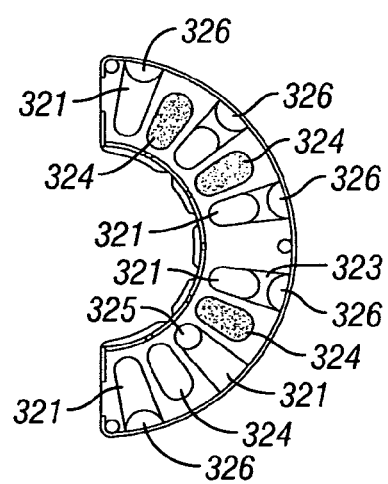
FIG. 11H is a schematic view of the protector half of FIG. 11E.

In one aspect the protector halves 311, 312 have a plurality of energy management zones, 321, 322, 323, 324 adjacent each other (with the zones 322, 323, 325, and 326 projecting further downwardly from a floor of zones 321). As is true for any embodiment hereof, the zones may be of the same or of different depths, and/or as in certain aspects, the zone sides are tapered (as may be any zone of any protector disclosed herein), e.g., but not limited to, with a two degree taper. FIGS. 11F-11H provide a key for zone depth for one particular embodiment of the protector 300 (the end of the protector 300 opposite the end shown in FIGS. 11D and 11E has corresponding zones). The zones blacked out in FIG. 11F are three inches deep; those in FIG. 11G, twelve-and-a-half inches deep; and those in FIG. 11H, eleven inches deep. Some (not all) of the corresponding zones are shown in FIG. 11C. As is true for any keel joint according to the present invention or centralizer according to the present invention, energy management zones reduce the amount of material in a body and facilitate the distribution of a focused or what is essentially a point load over a larger area and mass.

Figure 14A:
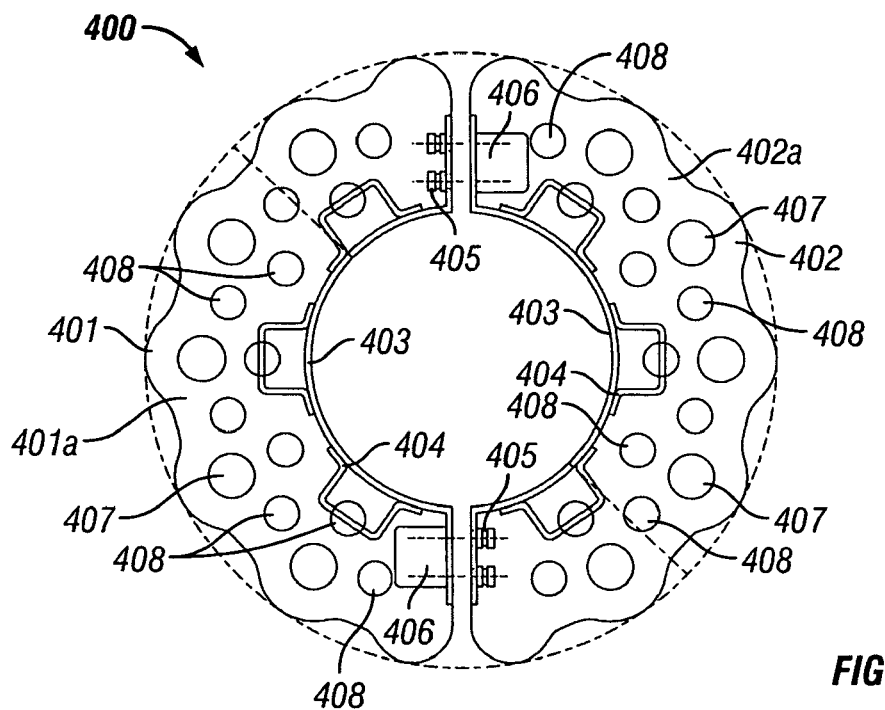
FIG. 14A is a top view of a protector according to the present invention.
Figure 14B:
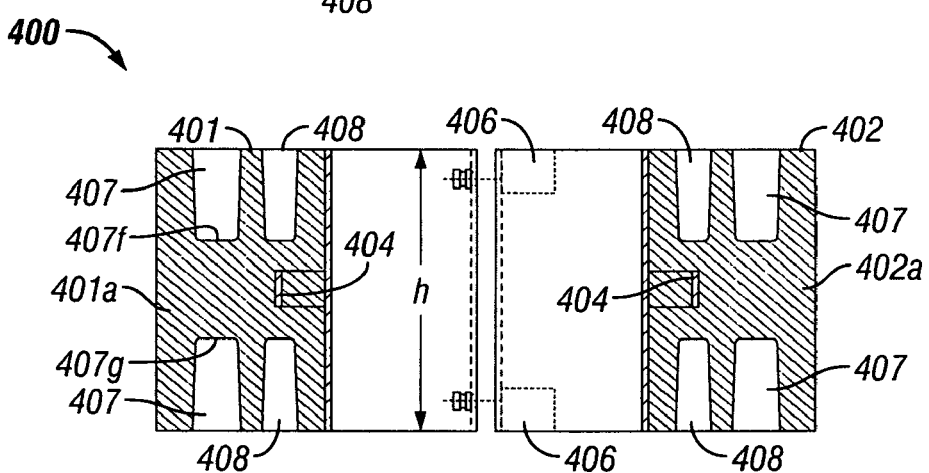
FIG. 14B is a side cross-section view of the protector of FIG. 14A.
Figure 14C:
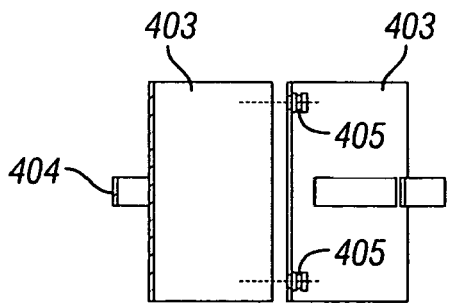
FIG. 14C is a side view of supports of the protector of FIG. 14A.
Figure 14D:
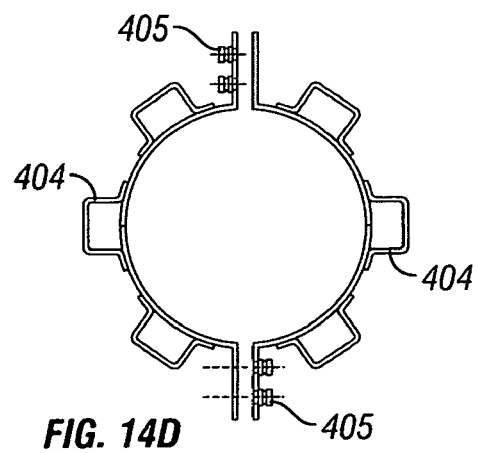
FIG. 14D is a top view of the supports of FIG. 14C.

FIGS. 14A and 14B show a protector 400 according to the present invention which has two halves 401, 402 each with a body 401a, 402a, respectively. Each half has an inner support 403 with body anchor brackets 404 and securement structure 405 for releasably securing the two halves 401, 402 together. Recesses 406 provide access to the securement structures 405. Each body half 401, 402 has a plurality of spaced-apart energy management zones 407 and 408. Corresponding top and bottom zones (as viewed in FIG. 14B) have floors (e.g. see the floors 407f, 407g, FIG. 14B) which are spaced-apart by a certain amount of the mass of the body of the protector. As shown the zones 407 are all of the same depth as are the zones 408 and the depth of all zones is the same. As with any protector according to the present invention, the zone depth for any zone may be a percentage of the total height (height h as viewed in FIG. 14B) which is, in certain aspects, between 10 and 45% of the height; in certain aspects with individual zones with depths of 10.7% of h, 39.2% of h, and 44.6% of h; and, in certain aspects, with at least two inches between the floors of corresponding zones.

Figure 12A:
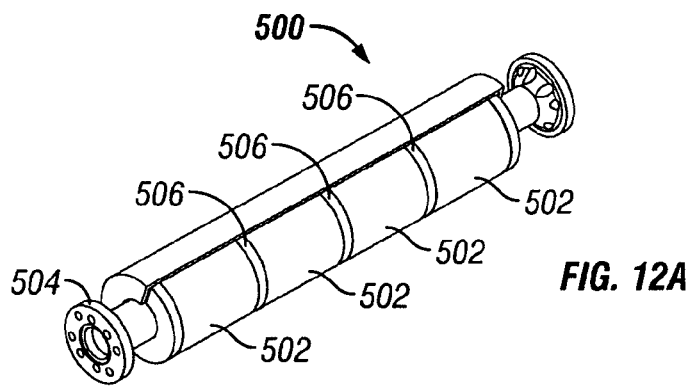
FIG. 12A is a perspective view of the protector according to the present invention.
Figure 12B:
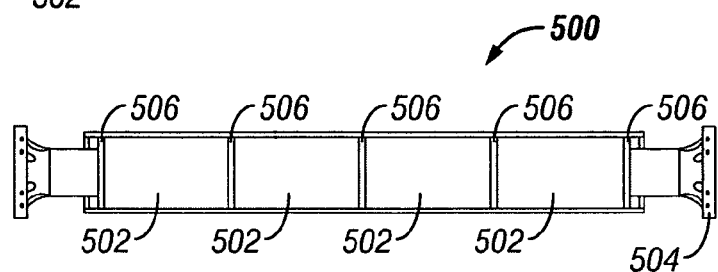
FIG. 12B is a cross-section view of the protector of FIG. 12A.

FIGS. 12A and 12B show a keel joint 500 according to the present invention which includes a plurality of spaced-apart protectors 502 on a riser pipe 504 with rings 506 between the protectors 502. A protective shell 508 (only half shown in FIG. 12A) is secured around the protectors 502. The rings 506, secured to the riser pipe 504, hold the protectors in place on the riser pipe 504 and support the weight of the protectors.

Figure 13A:
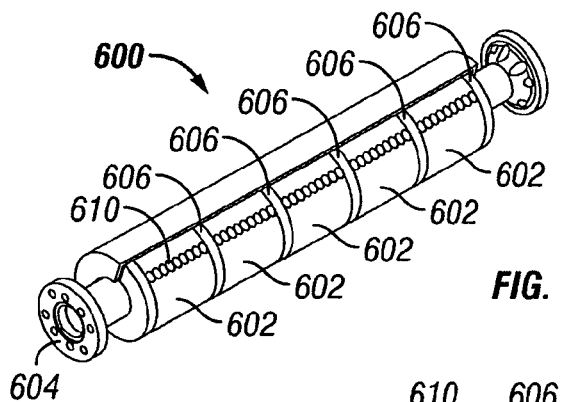
FIG. 13A is a perspective view of the protector according to the present invention.
Figure 13B:
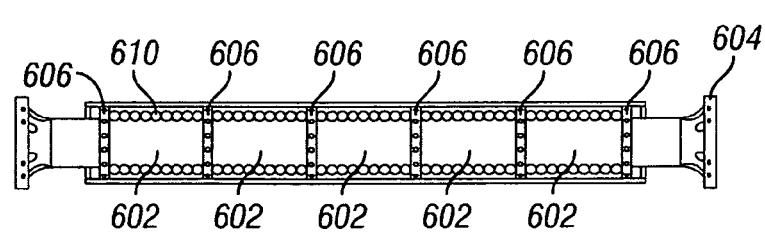
FIG. 13B is a cross-section view of the protector of FIG. 13A.

FIGS. 13A and 13B show a keel joint 600 according to the present invention which includes a plurality of spaced-apart protectors 602 on a riser pipe 604 with spacers 606 between the protectors 602. A protective shell 608 (only half shown in FIG. 13A) is secured around the protectors 602. As is true for any embodiment herein, rings, like the rings 606 can be deleted either so the protectors have empty space between them or so that protectors are positioned in contact with each other. Radially-oriented holes 610 extend through the protectors 602.

Figure 15:
FIG. 15 is a side view of a centralizer according to the present invention on a tubular member.

In certain particular aspects a structure according to the present invention (any disclosed herein) is used as a centralizer on a wellbore tubular (pipe, casing, tubing). FIG. 15 shows a centralizer 700 according to the present invention on a tubular member 702. The centralizer 700 may have the structure, materials, and details of any protector described above or disclosed herein.

A centralizer according to the present invention may be used, e.g., in place of centralizers as disclosed in U.S. Pat. Nos. 7,159,668; 6,435,275; 5,908,072; 5,881,810; 5,575,333; 5,261,488; 5,238,062; 5,095,981; 4,984,633; 4,794,986; 4,787,458; 3,963,075; 3,528,499; and 3,052,310.

The present invention, therefore, provides in at least some, but necessarily all, embodiments: keel joint protector including: a body made of flexible material, a central open bore through the body, and the body having a plurality of spaced-apart energy management zones therein for diffusing a force applied to a particular part of the body. Such a system may include one or some, in any possible combination, of the following: wherein the flexible material is polyurethane; the body having a central open bore therethrough, an inner support, an outer support, and the inner support spaced-apart from the outer support; wherein the body is molded onto the inner support and the outer support; wherein the inner support has a plurality of spaced-apart openings therethrough, said openings containing a portion of the flexible material that makes the body; a plurality of brackets on the inner support projecting outwardly from the inner support into the body, a plurality of brackets on the outer support projecting inwardly from the outer support into the body, and a portion of each bracket encased in the flexible material of the body; the body having a first primary body part, a second primary body part, a third primary body part, and a fourth primary body part, the plurality of spaced-apart energy management zones including a plurality of first zones, a plurality of second zones, a plurality of third zones, and a plurality of fourth zones, the plurality of first zones projecting inwardly of the body from the first primary body part, the plurality of second zones projecting inwardly of the body from the second primary body part, the plurality of third zones projecting inwardly of the body from the third primary body part, and the plurality of fourth zones projecting inwardly of the body from the fourth primary body part; the body having a central open bore therethrough, an inner support, an outer support, the inner support spaced-apart from the outer support, and a secondary body part extending from each primary body part to an inner support; a bracket in each primary part and encased therein, and a bracket in each secondary part and encased therein; wherein the energy management zones extend down into the body at different depths; an inner layer of flexible material on the inner support, and the central open bore defined by the inner layer; a plurality of spaced-apart gaps in the inner layer; the body made of two halves connected together including a first half and a second half; the first half having a first inner support and a first outer support, the second half having a second inner support and a second outer support, each inner support having a first end and a second end, a first inner lip on the first end of the first inner support adjacent an edge of the first body half, a second inner lip on the second end of the first inner support each adjacent an edge of the first body half, a third inner lip on the second inner support adjacent an edge of the second body half, a fourth inner lip on the second inner support adjacent an edge of the second body half, a first outer lip on the first outer support adjacent an edge of the first body half, a second outer lip on the first outer support adjacent an edge of the first body half, a third outer lip on the second outer support adjacent an edge of the second body half, and a fourth outer lip on the second outer support adjacent an edge of the second body half; a first fastener connecting the first inner lip and the third inner lip, and a second fastener connecting the second inner lip and the fourth inner lip; a third fastener connecting the first outer lip and the third outer lip, and a fourth fastener connecting the second outer lip and the fourth outer lip; a first fastener connecting the first inner lip and the third inner lip, a second fastener connecting the second inner lip and the fourth inner lip, a third fastener connecting the first outer lip and the third outer lip, and a fourth fastener connecting the second outer lip and the fourth outer lip; each energy management zone having a depth; and a plurality of adjacent energy management zones having different depths; and/or a plurality of the spaced-apart energy management zones each has portions therein with different depths.

The present invention, therefore, provides in at least some, but necessarily all, embodiments: a keel joint protector including: a body made of flexible material, a central open bore through the body, the body having a plurality of spaced-apart energy management zones therein for diffusing a force applied to a particular part of the body, an inner support connected to the body, an outer support connected to the body, the inner support spaced-apart from the outer support, the inner support having a plurality of spaced-apart openings therethrough, said openings containing a portion of the flexible material, a plurality of brackets on the inner support projecting outwardly from the inner support into the body, a plurality of brackets on the outer support projecting inwardly from the outer support into the body, a portion of each bracket encased in the flexible material, the body made of two halves, including a first half and a second half, the first half connected to the second half with fasteners.

The present invention, therefore, provides in at least some, but necessarily all embodiments, a keel joint including: a riser pipe; a plurality of keel joint protectors on the riser pipe comprising at least one pair of keel joint protectors; each of the plurality of keel joint protectors comprising a body made of flexible material, a central open bore through the body, the body having a plurality of spaced-apart energy management zones therein for diffusing a force applied to a particular part of the body; a support ring between each pair of keel joint protectors; and a protective shell over the keel joint protectors and support rings.

The present invention, therefore, provides in at least some, but necessarily all embodiments, a method for protecting a hull of a rig with respect to a keel joint adjacent the hull, the keel joint extending through an opening in the hull, the method including: positioning a keel joint with respect to a hull, the keel joint extending through an opening in the hull, the keel joint comprising a body made of flexible material, a central open bore through the body, the body having a plurality of spaced-apart energy management zones therein for diffusing a force applied to a particular part of the body; and contacting the hull with the keel joint so that a force is applied to the body of the keel joint and said force is diffused in the body.

The present invention, therefore, provides in at least some, but necessarily all embodiments, a centralizer for centralizing a tubular, the centralizer including: a body made of flexible material, a central open bore through the body, and the body having a plurality of spaced-apart energy management zones therein for diffusing a force applied to a particular part of the body.

In conclusion, therefore, it is seen that the present invention and the embodiments disclosed herein and those covered by the appended claims are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to the step literally and/or to all equivalent elements or steps. The following claims are intended to cover the invention as broadly as legally possible in whatever form it may be utilized. The invention claimed herein is new and novel in accordance with 35 U.S.C. §102 and satisfies the conditions for patentability in §102. The invention claimed herein is not obvious in accordance with 35 U.S.C. §103 and satisfies the conditions for patentability in §103. This specification and the claims that follow are in accordance with all of the requirements of 35 U.S.C. §112. The inventors may rely on the Doctrine of Equivalents to determine and assess the scope of their invention and of the claims that follow as they may pertain to apparatus not materially departing from, but outside of, the literal scope of the invention as set forth in the following claims. All patents and applications identified herein are incorporated fully herein for all purposes. What follows are some of the claims for some of the embodiments and aspects of the present invention, but these claims are not necessarily meant to be a complete listing of nor exhaustive of every possible aspect and embodiment of the invention. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words 'means for' together with an associated function. In this patent document, the word "comprising" is used in its non-limiting sense to mean that items following the word are including, but items not specifically mentioned are not excluded. A reference to an element by the indefinite article "a" does not exclude the possibility that more than one of the element is present, unless the context clearly requires that there be one and only one of the elements.

What is claimed is:

1. A keel joint protector comprising a body made of flexible material,
    a central open bore through the body, and
    the body having a plurality of spaced-apart energy management zones therein for diffusing a force applied to a particular part of the body,
    further comprising the body having a central open bore there through,
    an inner support,
    an outer support, and
    the inner support spaced-apart from the outer support, and,
    further comprising a plurality of brackets on the inner support projecting outwardly from the inner support into the body,
    a plurality of brackets on the outer support projecting inwardly from the outer support into the body, and
    a portion of each bracket encased in the flexible material of the body.

2. The keel joint of claim 1 wherein the flexible material is polyurethane.

3. The keel joint of claim 1 wherein the body is molded onto the inner support and the outer support.

4. The keel joint of claim 3 wherein the inner support has a plurality of spaced-apart openings therethrough, said openings containing a portion of the flexible material that makes the body.

5. The keel joint of claim 1 further comprising
    the body having a first primary body part,
        a second primary body part,
        a third primary body part, and
        a fourth primary body part,
    the plurality of spaced-apart energy management zones including a plurality of first zones,
        a plurality of second zones,
            a plurality of third zones, and
            a plurality of fourth zones,
    the plurality of first zones projecting inwardly of the body from the first primary body part,
    the plurality of second zones projecting inwardly of the body from the second primary body part,
    the plurality of third zones projecting inwardly of the body from the third primary body part, and
    the plurality of fourth zones projecting inwardly of the body from the fourth primary body part.

6. The keel joint of claim 1 further comprising the body having a central open bore therethrough,
    an inner support,an outer support,
    the inner support spaced-apart from the outer support, and
    a secondary body part extending from each primary body part to an inner support.

7. The keel joint of claim 1 further comprising a bracket in each primary part and encased therein, and a bracket in each secondary part and encased therein.

8. The keel joint of claim 1 wherein the energy management zones extend down into the body at different depths.

9. The keel joint of claim 1 further comprising an inner layer of flexible material on the inner support, and the central open bore defined by the inner layer.

10. The keel joint of claim 1 further comprising a plurality of spaced-apartgaps in the inner layer.

11. The keel joint of claim 1 further comprising the body made of two halves connected together including a first half and a second half.

12. The keel joint of claim 1 further comprising a first fastener connecting the first inner lip and the third inner lip, a second fastener connecting the second inner lip and the fourth inner lip,a third fastener connecting the first outer lip and the third outer lip, and a fourth fastener connecting the second outer lip and the fourth outer lip.

13. The keel joint of claim 1 further comprising each energy management zone having a depth, and a plurality of adjacent energy management zones having different depths.

14. The keel joint of claim 1 wherein a plurality of the spaced-apart energy management zones each has portions therein with different depths.

15. A keel joint comprising a body made of flexible material,
    a central open bore through the body, and
    the body having a plurality of spaced-apart energy management zones therein for diffusing a force applied to a particular part of the body, the body made of two halves connected together including a first half and a second half the first half having a first inner support and a first outer support, the second half having a second inner support and a second outer support, each inner support having a first end and a second end, a first inner lip on the first end of the first inner support adjacent an edge of the first body half, a second inner lip on the second end of the first inner support each adjacent an edge of the first body half, a third inner lip on the second inner support adjacent an edge of the second body half, a fourth inner lip on the second inner support adjacent an edge of the second body half, a first outer lip on the first outer support adjacent an edge of the first body half, a second outer lip on the first outer support adjacent an edge of the first body half, a third outer lip on the second outer support adjacent an edge of the second body half, and a fourth outer lip on the second outer support adjacent an edge of the second body half.

16. The keel joint of claim 15 further comprising a first fastener connecting the first inner lip and the third inner lip, and a second fastener connecting the second inner lip and the fourth inner lip.

17. The keel joint of claim 15 further comprising a third fastener connecting the first outer lip and the third outer lip, and a fourth fastener connecting the second outer lip and the fourth outer lip.

18. A keel joint protector comprising a body made of flexible material, a central open bore through the body, the body having a plurality of spaced-apart energy management zones therein for diffusing a force applied to a particular part of the body, an inner support connected to the body, an outer support connected to the body, the inner support spaced-apart from the outer support, the inner support having a plurality of spaced-apart openings therethrough, said openings containing a portion of the flexible material, a plurality of brackets on the inner support projecting outwardly from the inner support into the body, a plurality of brackets on the outer support projecting inwardly from the outer support into the body, a portion of each bracket encased in the flexible material, the body made of two halves, including a first half and, a second half, the first half connected to the second half with fasteners.

19. A keel joint comprising a riser pipe, a plurality of keel joint protectors on the riser pipe comprising at least one pair of keel joint protectors, each of the plurality of keel joint protectors comprising a body made of flexible material, a central open bore through the body, the body having a plurality of spaced-apart energy management zones therein for diffusing a force applied to a particular part of the body, a support ring between each pair of keel joint protectors, and a protective shell over the keel joint protectors and support rings.

20. A method for protecting a hull of a rig with respect to a keel joint adjacent the hull, the keel joint extending through an opening in the hull, the method comprising positioning a keel joint with respect to a hull, the keel joint extending through an opening in the hull, the keel joint comprising a body made of flexible material, a central open bore through the body, and, providing a centralizer for centralizing a tubular, the centralizer comprising a body made of flexible material, a central open bore through the body, the body having a plurality of spaced-apart energy management zones therein for diffusing a force applied to a particular part of the body, and contacting the hull with the keel joint so that a force is applied to the body of the keel joint and said force is diffused in the body.

* * * * *